(12) United States Patent
Burgers

(10) Patent No.: US 9,971,728 B2
(45) Date of Patent: May 15, 2018

(54) ELECTRICAL CONNECTORS

(71) Applicant: Peter Alan Burgers, Cambridge (GB)

(72) Inventor: Peter Alan Burgers, Cambridge (GB)

(73) Assignee: DISPLAYLINK (UK) LIMITED, Cambridge (GB)

( * ) Notice: Subject to any disclaimer, the term of this patent is extended or adjusted under 35 U.S.C. 154(b) by 225 days.

(21) Appl. No.: 15/100,219

(22) PCT Filed: Nov. 25, 2014

(86) PCT No.: PCT/GB2014/053479
§ 371 (c)(1),
(2) Date: May 27, 2016

(87) PCT Pub. No.: WO2015/079215
PCT Pub. Date: Jun. 4, 2015

(65) Prior Publication Data
US 2017/0024350 A1    Jan. 26, 2017

(30) Foreign Application Priority Data
Nov. 28, 2013   (GB) .................................... 1321012.5

(51) Int. Cl.
*G06F 13/00*   (2006.01)
*H01R 25/00*   (2006.01)
(Continued)

(52) U.S. Cl.
CPC ...... *G06F 13/4072* (2013.01); *G06F 13/4022* (2013.01); *H01R 24/60* (2013.01);
(Continued)

(58) Field of Classification Search
None
See application file for complete search history.

(56) References Cited

U.S. PATENT DOCUMENTS

| 7,589,536 B2 * | 9/2009 | Terlizzi ................. G06F 13/385 324/527 |
| 9,559,752 B1 * | 1/2017 | Krishnamachari .... H04B 3/542 |

(Continued)

FOREIGN PATENT DOCUMENTS

| GB | 2496738 | 5/2013 |
| GB | 2496962 | 5/2013 |

OTHER PUBLICATIONS

UK Search Report; UK Application No. GB1321012.5; 2 pages; dated May 23, 2014.
(Continued)

*Primary Examiner* — Hyun Nam
(74) *Attorney, Agent, or Firm* — Snell & Wilmer

(57) ABSTRACT

A connection system includes a flippable cable connector (7) for connecting wires in a cable (5) to a complementary host connector located at a host device (4), the cable connector having a set of cable terminals and a set of duplicate cable terminals corresponding to the set of cable terminals, and configured to be located symmetrically to the set of cable terminals, so that the connector has 180° rotational symmetry. A particular cable terminal (9) is connected to a particular wire (11) in the cable but the corresponding duplicate cable terminal (12) is not connected to it. The cable connector is connectable to the host connector such that either the set of cable terminals or the set of duplicate cable terminals is connected to host terminals of the host connector. The system includes means (18) for determining an orientation of the cable connector relative to the host connector.

31 Claims, 4 Drawing Sheets

(51) Int. Cl.
*G06F 13/40* (2006.01)
*H01R 24/60* (2011.01)
H01R 29/00 (2006.01)
H01R 107/00 (2006.01)

(52) U.S. Cl.
CPC ...... *G06F 2213/0042* (2013.01); *H01R 29/00* (2013.01); *H01R 2107/00* (2013.01); *H01R 2201/06* (2013.01)

(56) References Cited

U.S. PATENT DOCUMENTS

| | | | |
|---|---|---|---|
| 9,647,398 B2 * | 5/2017 | Golko | H01R 13/516 |
| 2004/0023560 A1 * | 2/2004 | Swoboda | H01R 29/00 439/638 |
| 2004/0237013 A1 | 11/2004 | Larson | |

OTHER PUBLICATIONS

International Search Report; PCT Application No. PCT/GB2014/053479; 11 pages; dated Mar. 24, 2015.

* cited by examiner

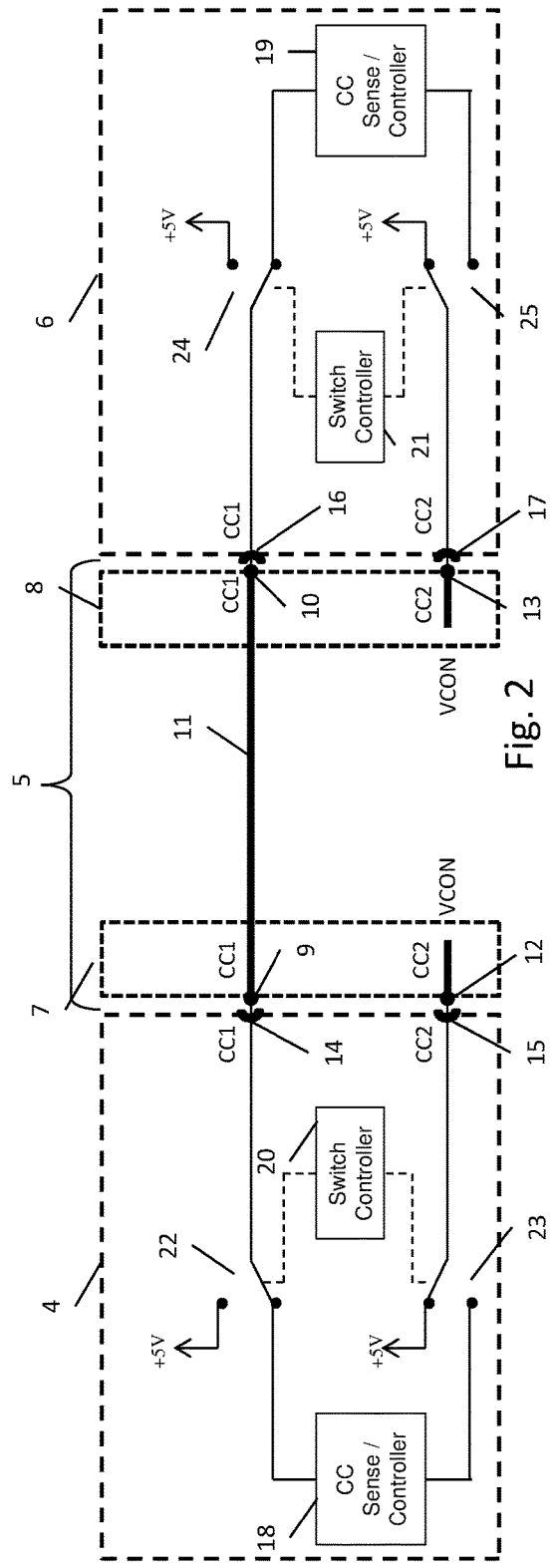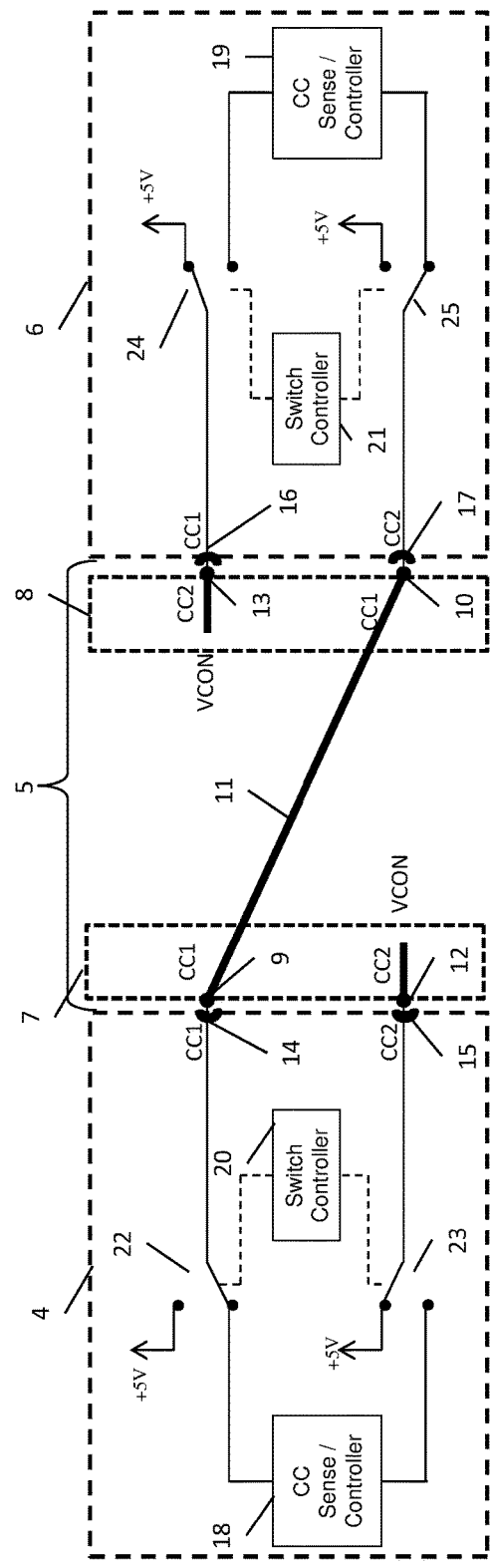

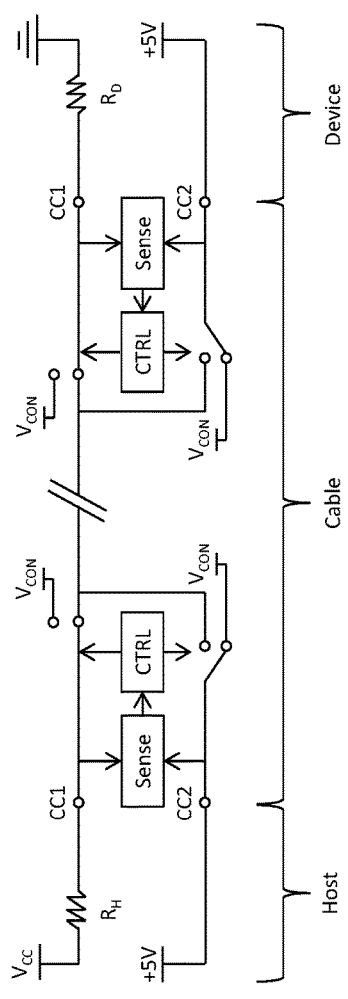
Fig. 6
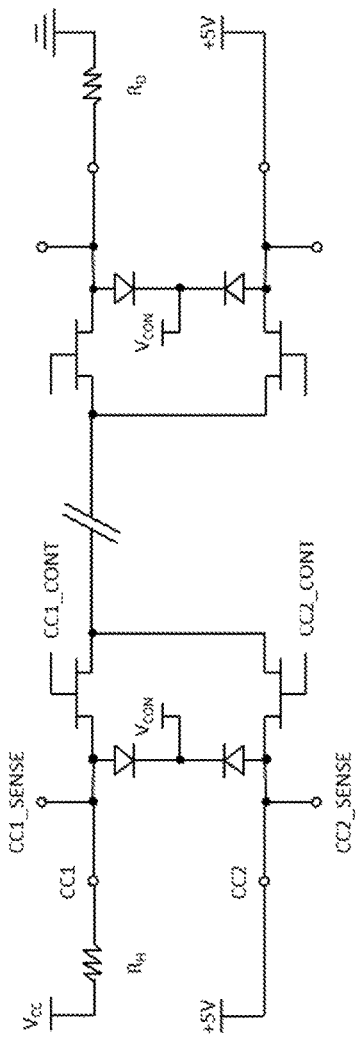 
Fig. 7

ELECTRICAL CONNECTORS

The present invention relates to electrical connectors of the type used for connecting various electrical or electronic devices using connecting cables.

As is well known, many electronic devices, such as computers, computerised devices, computer peripheral components, and many other electronic and electrical devices have socket (or plug) connectors provided to enable plug (or socket) connectors on either end of a cable to be inserted therein to connect two such devices together. There are many different types of connectors using different protocols and standards, usually having different numbers of terminals in different configurations. Often, the plug and socket connectors are configured so that a plug may only be inserted into a socket in one orientation, for example by making the socket and plug housings of a non-symmetric shape, so that they can only be connected by having the plug orientated in one particular way relative to the socket.

However, such connections mean that it is more difficult to insert the plug into the socket quickly, or when the socket cannot easily be seen, for example when it is hidden from view or in low light conditions. It is therefore desirable to provide a plug and socket connection in which the plug is "flippable", in that it can be inserted into the socket in either one of two orientations. In other words, the plug has 180° rotational symmetry. Although such connectors are easier to use, in general they require a duplication of the terminals in either the plug or the socket (or both), so that one set of the duplicated terminals in either the plug or the socket will connect to the terminals in the other of the plug or socket whichever way the plug is inserted. This leads, of course, to an increase in the number of terminals in the plug (or socket), making it larger and more expensive than an equivalent non-flippable connector plug (or socket). Furthermore, as connections require more functionality and more signals need to be connected, more terminals are required in the plugs, so such flippable plugs require twice the number and get ever larger.

In this specification, although the connectors on the ends of the cable may be termed "plugs" and the complementary connectors at the host devices may be termed "sockets", it will be apparent that these terms are interchangeable, and, indeed, the connectors may not be "plugs" and "sockets", but other shapes that can connect to each other. The terms "plug" and "socket" are therefore to be understood as meaning complementary connectors, although, for ease of understanding, the connectors on each end of the cable will be more often termed "plugs" and the connectors on the devices will more often be termed "sockets".

It is therefore an object of the present invention to reduce the number of terminals required in a flippable connector for a certain amount of functionality.

Embodiments of the invention will now be described in greater detail, by way of example only, with reference to the accompanying drawings, in which:

FIG. 2 shows a block diagram of an electronic connection system according a first embodiment of the present invention with a cable connector plug in a first orientation;

FIG. 3 shows a block diagram of the electronic connection system of FIG. 2 with the cable connector plug in a second orientation;

FIG. 6 shows a block diagram of an electronic connection system according a second embodiment of the present invention with a cable connector plug in a first orientation; and FIG. 7 shows a diagram of an implementation of the electronic connection system of FIG. 6 with the cable connector plug in the first orientation.

Figure 1:
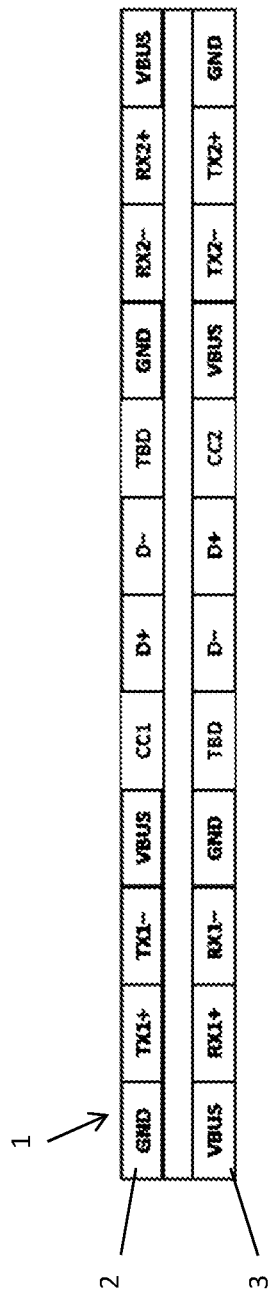
FIG. 1 shows a schematic diagram of an example of terminals in a flippable connector.

As explained above, a flippable connector is one that will continue to operate correctly whichever way it is connected to a complementary connector. Often, a flippable plug is provided on the end of a cable, with the plug being insertable into a corresponding socket in either of two orientations. FIG. 1 shows the pins on a 24-pin connector 1, having 2 rows of 12 pins. As can be seen, the bottom row 2 is identical to the top row 3, but arranged back-to-front as compared to the top row, so that the connector has 180° rotational symmetry. It will be noted, however, that the Tx, Rx and CC pins are marked with a suffix 1 or 2 to distinguish them. Thus, even though only one CC connection is needed, two CC terminals, CC1 and CC2 are needed on the plug to maintain rotational symmetry. In this case, both pins will be connected to a single CC wire in the cable, which is then, at the other end of the cable, connected to both CC pins in the plug at the far end, so that, whichever way the plugs at both ends of the cable are inserted into their respective host sockets, the CC signal will travel across the cable from one CC host terminal to the other CC host terminal. The CC signal is a control (or data) signal that is used in the Universal Serial Bus (USB) protocol, but any other control signal may be used.

According to one embodiment of the present invention, therefore, only one of the two CC cable terminals at each end of the cable, is connected to the CC cable wire. As shown in FIGS. 2 and 3, in this example, the CC signal is used to establish a one-wire communication between a host device 4 at one end of the cable 5 and a client device 6 at the other end. A host plug 7 on one end of the cable 5 is used to connect to the host device 4 and a device plug 8 is used to connect to the client device 6. Only the plug CC terminals are shown at each end of the cable 5, although, as explained earlier, there are likely to be many more terminals at each end, with wires connecting them in the cable 5. Although there are two CC terminals in the pinout of each cable plug connector, there is only one physical CC wire in the cable 1. This provides for the following possibilities:

CC1 at one end connected to CC1 at the other;
CC1 at one end connected to CC2 at the other;
CC2 at one end connected to CC1 at the other;
CC2 at one end connected to CC2 at the other.

In the embodiment of FIGS. 2 and 3, CC1 plug terminal 9 in the plug connector 7 and CC1 plug terminal 10 in the plug connector 8 are connected via a CC wire 11 in the cable 5, but the CC2 plug terminals 12 and 13 are not. The CC2 terminals 12 and 13 are connected within the cable plug connectors 7 and 8 to provide a power signal, termed $V_{CON}$, to active circuitry within the plug connectors 7 and 8 themselves. Such active electronics are increasingly provided within plug connectors of a cable to provide functionality within the cable connectors, for example to provide an indication, such as a Light Emitting Diode (LED), to indicate whether the plug connector is properly connected to the socket connector. However, other functionality that requires power may also or alternatively be provided in the plug connectors, for example to provide intelligence within them, to power active circuitry used to extend the range of the signalling in the cable, or to provide signalling or protocol conversion functionality within the cable itself.

In the orientation shown in FIG. 2, plug connector 7 is connected to the socket connector of host device 4 such that CC1 plug terminal 9 is connected to CC1 socket terminal 14 and CC2 plug terminal 12 is connected to CC2 socket terminal 15. Similarly, plug connector 8 is connected to the socket connector of client device 6 such that CC1 plug terminal 10 is connected to CC1 socket terminal 16 and CC2 plug terminal 13 is connected to CC2 socket terminal 17. Thus, in order to operate correctly, host device 4 must provide the CC signal at the CC1 socket terminal 14 and the $V_{CON}$ signal at the CC2 socket terminal 15. Similarly, client device 6 must provide the CC signal at the CC1 socket terminal 16 and the $V_{CON}$ signal at the CC2 socket terminal 17. In order to do so correctly, sensor 18 and 19 are provided in the host device 4 and the client device 6 to sense the orientation of the host plug connector 7 and the client plug connector 8 relative to the respective host and client socket terminals. In other words, the sensor 18 determines whether the CC1 plug terminal 9 is connected to the CC1 host terminal 14 and the CC2 plug terminal 12 is connected to the CC2 socket terminal 15 (as shown in FIG. 2), or whether the host plug connector 7 has been flipped so that the CC1 plug terminal 9 is connected to the CC2 host terminal 15 and the CC2 plug terminal 12 is connected to the CC1 socket terminal 14. Similarly, the sensor 19 determines whether the CC1 plug terminal 10 is connected to the CC1 host terminal 16 and the CC2 plug terminal 13 is connected to the CC2 socket terminal 17 (as shown in FIG. 2), or whether the host plug connector 8 has been flipped so that the CC1 plug terminal 10 is connected to the CC2 host terminal 17 and the CC2 plug terminal 13 is connected to the CC1 socket terminal 16 (as shown in FIG. 3).

The sensor could operate in many different ways, for example if there are other signals connected through the cable in one particular orientation, the presence/absence of connectivity on these signals can be used to determine the connector orientation, or by determining an orientation of a housing of the plug connector by a sense pin on the receptacle that uses a physical asymmetry in the plug to detect the connector insertion orientation (for example, where the sense pin might be shorted to ground in orientation A, but left floating in orientation B), or in any other way. This orientation information can be used by the other circuitry inside the cable. For example, other data signals may be multiplexed between different pins in order to minimise the number of wires required in the cable.

One preferred technique is to use the CC signal itself to determine which of the CC plug terminals of the cable connectors are used to connect the CC signal through from the host device to the client device. In this case, when the cable is plugged in, either CC1 socket terminal 14 or CC2 socket terminal 15 of the host device 4 will be connected to either CC1 socket terminal 16 or CC2 socket terminal 17 of the client device 6. This will cause the connected pins to experience a change in voltage, which can be sensed to determine which of the socket terminals are connected via the CC wire 11. Once this is known, the sensors 18 and 19 provide the information to respective switch controllers 20 and 21 in the host and client devices 4 and 6. The switch controllers 20 and 21 are used to control switches 22, 23, 24 and 25 for switching either the CC signal or a $V_{CON}$ power signal to the appropriate socket terminals. The $V_{CON}$ power signal may be +5V, as illustrated, but may be any appropriate voltage level. Thus, switch 22 is used to switch either the CC signal or the $V_{CON}$ signal to the CC1 socket terminal 14, switch 23 is used to switch either the CC signal or the $V_{CON}$ signal to the CC2 socket terminal 15, switch 24 is used to switch either the CC signal or the $V_{CON}$ signal to the CC1 socket terminal 16, and switch 25 is used to switch either the CC signal or the $V_{CON}$ signal to the CC2 socket terminal 17.

Figure 5:
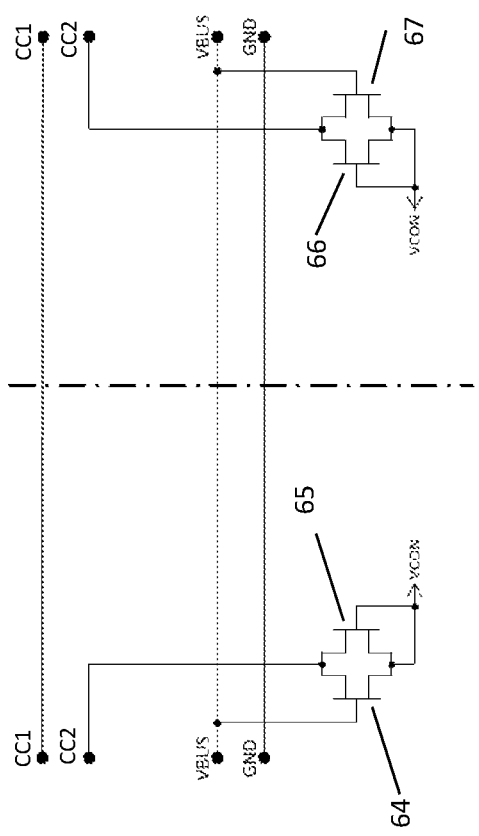
FIG. 5 shows a diagram of an example of implementation of a cable connector, which may be used in the connector system of FIG. 4.
Figure 4:
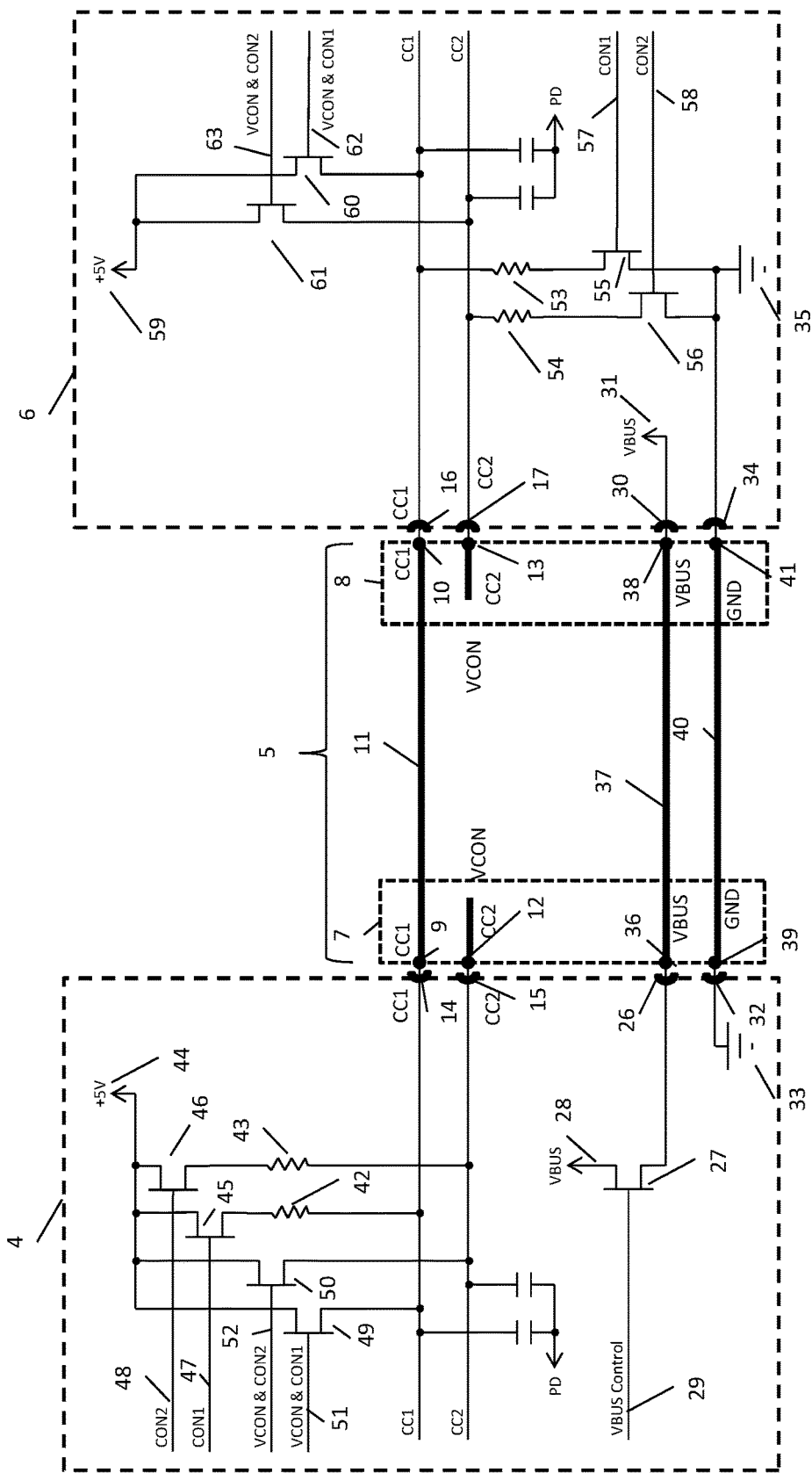
FIG. 4 shows a diagram of an implementation of the electronic connection system of FIG. 2 with the cable connector plug in the first orientation.

FIGS. 4 and 5 illustrate how the sensors and switch controllers could be implemented, in one example. In this case, the orientation shown in FIG. 4 is the same as that in FIG. 2, with the host and client socket and plug terminals all having the same reference numerals as in FIGS. 2 and 3. In this case, however, further host and client socket and plug terminals are shown for the $V_{BUS}$ power signal and for GND, where a host $V_{BUS}$ socket terminal 26 is connected, via a switching transistor 27 to a $V_{BUS}$ source 28, and the switching transistor 27 is controlled by a $V_{BUS}$ Control signal 29, and a client $V_{BUS}$ socket terminal 30 is connected to a $V_{BUS}$ line 31 in the client device, and a host GND socket terminal 32 is connected to relative ground potential 33, and a client GND socket terminal 34 is connected to relative ground potential 35. The host $V_{BUS}$ socket terminal 26 is connectable to the client $V_{BUS}$ socket terminal 30 via host $V_{BUS}$ plug terminal 36, $V_{BUS}$ wire 37 and client $V_{BUS}$ plug terminal 38. Similarly, the host GND socket terminal 32 and the client GND socket terminal 34 are connected via host GND plug terminal 39, GND wire 40 and client GND plug terminal 41.

In the host device 4, pullup resistors 42 and 43 are connected between the CC1 and CC2 host socket terminals 14 and 15, respectively, and a 5V supply 44, via respective switching transistors 45 and 46, which switching transistors 45 and 46 are controlled by CON1 and CON 2 control signals 47 and 48. The CC1 and CC2 host socket terminals 14 and 15 are also directly connected to the 5V supply 44, via respective switching transistors 49 and 50, which switching transistors are controlled by $V_{CON}$ CON1 and $V_{CON}$ CON 2 control signals 51 and 52. The CC1 and CC2 host socket terminals 14 and 15 may also be connected via capacitors to a PD line, to provide a method of transmitting ac-coupled signalling between the host device 4 and the client device 6.

In the client device 6, pulldown resistors 53 and 54 are connected between the CC1 and CC2 client socket terminals 16 and 17, respectively, and the relative ground potential 35, via respective switching transistors 55 and 56, which switching transistors 55 and 56 are controlled by CON1 and CON 2 control signals 57 and 58. The CC1 and CC2 client socket terminals 16 and 17 are also directly connected to a 5V supply 59, via respective switching transistors 60 and 61, which switching transistors 60 and 61 are controlled by $V_{CON}$ CON1 and $V_{CON}$ CON 2 control signals 62 and 63. The CC1 and CC2 client socket terminals 16 and 17 may also be connected via capacitors to a PD line, to provide a method of transmitting ac-coupled signalling between the host device 4 and the client device 6.

In this embodiment, therefore, the host device 4 can apply a pullup resistor to either CC host socket terminal. The client device 6 can apply a pulldown resistor to either CC client socket terminal. Both the host device 4 and the client device 6 can apply +5V ($V_{CON}$) to either CC socket terminal. The host device 4 can turn $V_{BUS}$ on or off.

It will be apparent, however, that, depending on particular requirements, transistors 49, 50, 60 and 61 could be connected to a different voltage from that of transistors 45 and 46. For example, transistors 45 and 46 could be connected to a different supply (such as $V_{CC}$). Similarly, as mentioned above, a +5V supply for $V_{CON}$ is just an example; in fact, any appropriate voltage supply could be used. As far as the $V_{BUS}$ supply is concerned, the host/client roles could be swapped, with the client device 6 supplying $V_{BUS}$ (through a transistor analogous to transistor 27), and the host device 4 could be powered by $V_{BUS}$. Similarly, the $V_{BUS}$ supply direction could be reversed on the fly or the voltage changed once the connection has been established. Finally, although the above implementations are described with the host device 4 having CC pullup resistors and the client device 6 having CC pulldown resistors, it will be apparent that these could be reversed, provided the client device 6 has a power source other than $V_{BUS}$.

The system operates in a number of states, as follows:

State 1: Reset

The "reset" state is used to ensure all elements in the circuit are reset to a known state. All switching transistors are off. There is no voltage applied to any of the connector socket terminals. After a short period of time, the host device 4 and client device 6 enter the "sense" state.

State 2: Sense

In this state, the host device 4 and client device 6 are waiting for the cable 5 to be connected. The host device 4 has $V_{BUS}$ turned off. The host device 4 and client device 6 both have $V_{CON}$ turned off. The host device 4 has both pullup resistors 42 and 43 connected to the host socket terminals 14 and 15. The host device 4 has transistors 45 and 46 switched on, which causes both pullup resistors 42 & 43 to be connected to the +5V supply 44. The client device 6 has both pulldown resistors 53 and 54 connected to the client socket terminals 16 and 17. Similarly, the client device 6 has transistors 55 and 56 switched on, which causes both pulldown resistors 53 & 54 to be connected to the relative ground potential 35.

When the cable 5 is plugged in, one of the host device's CC terminals 14 or 15 will be connected to one of the client device's CC terminals 16 or 17. This will cause the voltage on that CC socket terminal to change, due to the pullup resistor on the host side being connected to a pulldown resistor on the device side. The change in voltage on the CC socket terminal is detected by both the host device 4 and client device 6, causing them to enter the "connected" state.

State 3: Connected

This state consists of two substates: "$V_{CON}$ on CC1" and "$V_{CON}$ on CC2". The two ends of the cable can be in either substate, depending on the orientation of the cable connection:

If the host device 4 detects that its CC1 signal is pulled down by the client device 6, it enters the "$V_{CON}$ on CC2" substate.

If the host device 4 detects that its CC2 signal is pulled down by the client device 6, it enters the "$V_{CON}$ on CC1" substate.

If the client device 6 detects that its CC1 signal is pulled up by the host device 4, it enters the "$V_{CON}$ on CC2" substate.

If the client device 6 detects that its CC2 signal is pulled up by the host device 4, it enters the "$V_{CON}$ on CC1" substate.

Substate 3a: VCON on CC1

In this substate, the host device/client device connects the CC function to the CC2 terminals, and supplies $V_{CON}$ power to the cable's active circuitry using the CC1 terminals. The host device/client device leaves its CC2-connected pullup/pulldown resistors switched to the CC2 terminals. The host device/client device applies +5V ($V_{CON}$) to the CC1 terminals. The host device turns on $V_{BUS}$.

Substate 3b: VCON on CC2

In this substate, the host device/client device connects the CC function to the CC1 terminals, and supplies $V_{CON}$ power to the cable's active circuitry using the CC2 terminals. The host device/client device leaves its CC1-connected pullup/pulldown resistors switched to the CC1 terminals. The host device/client device applies +5V ($V_{CON}$) to the CC2 terminals. The host device turns on $V_{BUS}$.

State 4: Reset

When the cable is unplugged, the host device/client device detect that the CC signal has been released. They then go back to the "reset" state, where all switching transistors are turned off.

The states described above are indicated in Table 1 below.

TABLE 1

| State | VCON | CON1 | CON2 | VBUS Cntrl |
|---|---|---|---|---|
| Reset | 0 | 0 | 0 | 0 |
| Sense | 0 | 1 | 1 | 0 |
| VCON on CC1 | 1 | 1 | 0 | 1 |
| VCON on CC2 | 1 | 0 | 1 | 1 |

If an active cable is used, it must wait until the host device/client device has progressed to one of the "Connected" substates before drawing power from $V_{BUS}$. This is to ensure that the sense mechanism is not disrupted. An implementation to achieve this is shown in FIG. 5, where a pair of transistors 64 and 65 are provided in the host plug 7 and coupled with their source electrodes coupled together and to the CC2 plug terminal to receive the $V_{CON}$ power signal and the drain electrodes coupled together to supply the $V_{CON}$ power to the circuitry inside the host plug 7 and the control electrode of one transistor also connected to the drain electrodes and the control electrode of the other transistor coupled to the $V_{BUS}$ plug terminal to receive the $V_{BUS}$ power signal. Similarly, a pair of transistors 66 and 67 are provided in the client plug 8 and coupled with their source electrodes coupled together and to the CC2 plug terminal to receive the $V_{CON}$ power signal and the drain electrodes coupled together to supply the $V_{CON}$ power to the circuitry inside the client plug 8 and the control electrode of one transistor also coupled to the drain electrodes and the control electrode of the other transistor coupled to the $V_{BUS}$ plug terminal to receive the $V_{BUS}$ signal. In this way, the $V_{CON}$ supply to the cable's active circuitry remains switched off until $V_{BUS}$ goes high. Once this happens, the $V_{CON}$ switch is latched on until both $V_{BUS}$ and $V_{CON}$ go low (the "reset" state).

In a second embodiment, as shown in FIG. 6, the sensing and switching circuitry is arranged in the cable connectors themselves, rather than in the host device and the client device. This option is desirable in applications where all cables contain other circuitry, since the additional cost of the sensing and switching circuitry is likely to be minimal.

As shown in FIG. 6, each connector at the ends of the cable contains a sense circuit to detect which CC plug terminal is connected to +5V, a control circuit to switch each CC plug terminal between the $V_{CON}$ supply to power the circuitry in the near end of the cable and the CC wire connected to the far end of the cable. In the host device the CC1 socket terminal is pulled up to VCC using a resistor $R_H$ and the CC2 socket terminal is tied to +5V. In the client device the CC1 socket terminal is pulled down to ground using resistor $R_D$ and the CC2 socket terminal is tied to +5V. In this case, there is no sensing or control required in the host device or client device. All of the intelligence is provided in the cable plug connectors. However the client device and/or host device could optionally include CC sensing circuitry in order to determine when an end-to-end host device to client device connection has been made or broken. This is not shown in FIG. 6.

Host Device Connection:

When the cable is plugged into the host device, the sense circuit in the host plug detects which CC plug terminal is connected to +5V. This could be done using one of the following methods:

In an implementation where $V_{CC}$ is chosen to be lower than +5V, the sense circuit can detect which CC plug terminal is at the highest voltage. This plug terminal will be the $V_{CON}$ supply.

In an implementation where $V_{CC}$ is chosen to be equal to +5V, the sense circuit can apply a small load to each CC plug terminal, and detect which CC plug terminal is at the highest voltage. The plug terminal with the highest voltage will be the $V_{CON}$ supply, since the other plug terminal's $V_{CC}$ power is connected through the resistor $R_H$.

In an implementation where $V_{CC}$ is chosen to be greater than +5V, the sense circuit can detect which CC plug terminal is at the lowest voltage. This plug terminal will be the $V_{CON}$ supply.

Once the sense circuit has determined which CC plug terminal is to be used for $V_{CON}$, the control circuit connects this CC plug terminal to the $V_{CON}$ supply in the near end of the cable, and connects the other CC plug terminal to the CC wire connected to the far end of the cable.

Client Device Connection:

When the client plug is connected to the client device, the sense circuit in the client plug detects which CC plug terminal is connected to +5V. Since the circuitry in both ends of the cable is identical, this is done in exactly the same manner as for the host connection. Once the sense circuit has determined which CC plug terminal is to be used for $V_{CON}$, the control circuit connects the CC plug terminals in the same manner as for the host connection case.

Connector Orientation Detection

Once both the host device and the client device are connected to the cable, the sense circuitry in either plug has already determined which CC plug terminal is connected to the $V_{CON}$ terminal on the host device or client device. This indicates the orientation of the plug (upside-up or upside-down). This orientation information can be used by the other circuitry inside the cable. For example, other data signals may be multiplexed between different pins in order to minimise the number of wires required in the cable.

An example implementation of the embodiment of FIG. 6 is shown in FIG. 7. The example circuit shows a potential implementation example, in which $V_{CC}$ is set to a voltage lower than the 5V of $V_{CON}$ (eg. $V_{CC}$=3.3V).

Host Device Connection

When the cable is plugged into the host device, two diodes ensure that the $V_{CON}$ supply in the cable is powered from the $V_{CON}$ supply of the host device. Since the $V_{CON}$ supply is at a higher voltage than the $V_{CC}$ supply, all of the $V_{CON}$ current will be sourced from the $V_{CON}$ supply. A comparator circuit detects which CC plug terminal is connected to the $V_{CC}$ socket terminal of the host device:

If CC1_SENSE is at a lower voltage than CC2_SENSE:
CC1_CONT signal is driven high, which connects CC1 to the far end of the cable;
CC2_CONT signal is driven low, which ensures CC2 is not connected to the far end of the cable.

If CC1_SENSE is at a higher voltage than CC2_SENSE:
CC2_CONT signal is driven high, which connects CC2 to the far end of the cable;
CC1_CONT signal is driven low, which ensures CC1 is not connected to the far end of the cable.

It will be apparent that similar equivalent detection methods can be used if $V_{CC}$ is chosen to be equal to or greater than +5V.

Client Device Connection

The client device end of the cable connects in exactly the same manner as for the host device, so the full description is not repeated here. The diodes supply $V_{CON}$ from whichever CC plug terminal is connected to the client device's +5V supply. The comparator detects which CC plug terminal is connected to the grounded CC terminal on the client device, and turns on the corresponding FET switch, in the same manner as for the host device.

It will be apparent that apparatus aspects may be applied to method aspects and vice versa. The skilled reader will appreciate that apparatus embodiments may be adapted to implement features of method embodiments and that one or more features of any of the embodiments described herein, whether defined in the body of the description or in the claims, may be independently combined with any of the other embodiments described herein.

Although several embodiments have been described in detail above, it will be appreciated that various changes, modifications and improvements can be made by a person skilled in the art without departing from the scope of the present invention as defined in the claims.

The invention claimed is:

1. A connection system comprising:
a cable connector for connecting wires in a cable to a complementary host connector located at a host device, the cable connector comprising a set of cable terminals and a set of duplicate cable terminals corresponding to the set of cable terminals, and configured to be located rotationally symmetrically to the set of cable terminals, so that the connector has 180° rotational symmetry, wherein a particular cable terminal of the set of cable terminals is connected to a particular wire in the cable and a corresponding particular duplicate cable terminal in the set of duplicate cable terminals is not connected to the particular wire,
a host connector comprising a set of host terminals which are complementary to the cable terminals of the cable connector and including a particular host terminal complementary to the particular cable terminal and to the particular duplicate cable terminal and a set of duplicate host terminals including a duplicate particular host terminal corresponding to the particular host terminal in the set of host terminals, but configured to be located rotationally symmetrically to the particular host terminal in the set of host terminals and to be complementary to the particular cable terminal and the particular duplicate cable terminal,
whereby the cable connector is connectable to the host connector such that either the set of cable terminals or the set of duplicate cable terminals is connected to the set of host terminals wherein either the particular cable terminal in the set of cable terminals or the particular duplicate cable terminal in the set of duplicate cable terminals connects to the particular host terminal and the other of the particular cable terminal in the set of cable terminals or the particular duplicate cable terminal in the set of duplicate cable terminals connects to the particular duplicate host terminal in the set of duplicate host terminals, means for determining an orientation of the cable connector relative to the host connector, when it is connected to the host connector;
a first switch for switching a first signal to the particular cable terminal based on the determined orientation, whereby the first signal is coupled to the particular wire in the cable; and
a second switch for switching a second signal to the particular duplicate cable terminal based on the determined orientation, whereby the second signal is not coupled to the particular wire in the cable.

2. A connection system according to claim 1, wherein the first signal is a control or data signal, and the second signal is a power signal for powering circuitry in the cable connector.

3. A connection system according to claim 1, wherein the means for determining an orientation of the cable connector comprises sensing circuitry.

4. A connection system according to claim 3, wherein either:
a signal is applied to both the particular host terminal and the particular duplicate host terminal and the sensing circuitry is configured to determine which of the particular host terminal and the particular duplicate host terminal is connected to the particular cable terminal based on a change in the applied signal; or
the sensing circuitry is configured to sense if there are other signals which are connected through the cable connector in one orientation, the presence or absence of connectivity of these signals being used to determine the cable connector orientation.

5. A connection system according to claim 3, wherein the sensing circuitry is configured to determine an orientation of a housing of the cable connector by a sense pin on the housing that uses a physical asymmetry in the cable connector to detect the cable connector orientation.

6. A connection system according to claim 5, wherein the sense pin is shortable to ground when the cable connector is in a first orientation, but is left floating in a second orientation.

7. A connection system according to claim 1, wherein the first signal is switched to whichever of the particular host terminal or particular duplicate host terminal is connected to the particular cable terminal, based on the determined orientation.

8. A connection system according to claim 1, further comprising a switch controller coupled to the means for determining orientation of the cable connector and to first and second switches for controlling the first and second switches to switch either the first signal or the second signal to the particular plug terminal or the particular duplicate plug terminal based on the determined orientation.

9. A connection system according to claim 8, wherein the switch controller is located in either the host device or in the cable connector.

10. A connection system according to claim 1, wherein the means for determining orientation of the cable connector is located either in the host device or in the cable connector.

11. A host device having a host connector for connection to a cable connector;
the cable connector comprising a set of cable terminals and a set of duplicate cable terminals corresponding to the set of cable terminals, and configured to be located rotationally symmetrically to the set of cable terminals, so that the cable connector has 180° rotational symmetry, wherein a particular cable terminal of the set of cable terminals is connected to a particular wire in the cable and a corresponding particular duplicate cable terminal in the set of duplicate cable terminals is not connected to the particular wire;
the host device comprising:
a host connector comprising a set of host terminals which are complementary to the cable terminals of the cable connector and including a particular host terminal complementary to the particular cable terminal and to the particular duplicate cable terminal and a set of duplicate host terminals including a particular duplicate host terminal corresponding to the particular host terminal in the set of host terminals, but configured to be located rotationally symmetrically to the particular host terminal in the set of host terminals and to be complementary to the particular cable terminal and the particular duplicate cable terminal,
whereby the cable connector is connectable to the host connector such that either the set of cable terminals or the duplicate set of cable terminals is connected to the set of host terminals wherein either the particular cable terminal in the set of cable terminals or the particular duplicate cable terminal in the set of duplicate cable terminals connects to the particular host terminal and the other of the cable terminal in the set of cable terminals or the particular duplicate cable terminal in the set of duplicate cable terminals connects to particular duplicate host terminal in the set of duplicate host terminals,
means for determining an orientation of the cable connector relative to the host connector, when it is connected to the host connector;
a first switch for switching a first signal to the particular cable terminal based on the determined orientation, whereby the first signal is coupled to the particular wire in the cable; and
a second switch for switching a second signal to the particular duplicate cable terminal based on the determined orientation, whereby the second signal is not coupled to the particular wire in the cable.

12. A host device according to claim 11, wherein the first signal is a control or data signal, and the second signal is a power signal for powering circuitry in the cable connector.

13. A host device according to claim 11, wherein the means for determining an orientation of the cable connector comprises sensing circuitry.

14. A host device according to claim 13, wherein either:
a signal is applied to both the particular host terminal and the particular duplicate host terminal and the sensing circuitry is configured to determine which of the particular host terminal and the particular duplicate host terminal is connected to the particular cable terminal based on a change in the applied signal; or
the sensing circuitry is configured to sense if there are other signals which are connected through the cable connector in one orientation, the presence or absence of connectivity of these signals being used to determine the cable connector orientation.

15. A host device according to claim 13, wherein the sensing circuitry is configured to determine an orientation of a housing of the cable connector by a sense pin on the housing that uses a physical asymmetry in the cable connector to detect the cable connector orientation.

16. A host device according to claim 15, wherein the sense pin is shortable to ground when the cable connector is in a first orientation, but is left floating in a second orientation.

17. A host device according to claim 11, wherein the first signal is switched to whichever of the particular host terminal or particular duplicate host terminal is connected to the particular cable terminal, based on the determined orientation.

18. A host device according to claim 11, further comprising a switch controller coupled to the means for determining orientation of the cable connector and to first and second switches for controlling the first and second switches to switch either the first signal or the second signal to the particular plug terminal or the particular duplicate plug terminal based on the determined orientation.

19. A host device according to claim 18, wherein the switch controller is located in either the host device or in the cable connector.

20. A host device according to claim 11, wherein the means for determining orientation of the cable connector is located either in the host device or in the cable connector.

21. A cable connector for connecting wires in a cable to a complementary host connector located at a host device, the cable connector comprising a set of cable terminals and a set of duplicate cable terminals corresponding to the set of cable terminals, and configured to be located rotationally symmetrically to the set of cable terminals, so that the connector has 180° rotational symmetry, wherein a particular cable terminal of the set of cable terminals is connected to a particular wire in the cable and a corresponding particular duplicate cable terminal in the set of duplicate cable terminals is not connected to the particular wire;

whereby the cable connector is connectable to
a host connector comprising a set of host terminals which are complementary to the cable terminals of the cable connector and including a particular host terminal complementary to the particular cable terminal and to the particular duplicate cable terminal and a set of duplicate host terminals including a particular duplicate host terminal corresponding to the particular host terminal in the set of host terminals, but configured to be located rotationally symmetrically to the particular host terminal in the set of host terminals and to be complementary to the particular cable terminal and the particular duplicate cable terminal, such that either the set of cable terminals or the duplicate set of cable terminals is connected to the set of host terminals wherein either the particular cable terminal in the set of cable terminals or the particular duplicate cable terminal in the set of duplicate cable terminals connects to the particular host terminal and the other of the particular cable terminal in the set of cable terminals or the particular duplicate cable terminal in the set of duplicate cable terminals connects to the particular duplicate host terminal in the set of duplicate host terminals, wherein the particular cable terminal receives a first signal via whichever of the particular host terminal or particular duplicate host terminal the particular cable terminal is connected to, the first signal having been switched to whichever of the particular host terminal or particular duplicate host terminal the particular cable terminal is connected to based on a determined orientation of the cable connector relative to the host connector, whereby the first signal is coupled via the particular cable terminal to the particular wire in the cable; and wherein the particular duplicate cable terminal receives a second signal via whichever of the particular host terminal or particular duplicate host terminal the particular duplicate cable terminal is connected to, the second signal having been switched to whichever of the particular host terminal or particular duplicate host terminal the particular duplicate cable terminal is connected to based on the determined orientation of the cable connector relative to the host connector, whereby the second signal is not coupled to the particular wire in the cable.

22. A cable connector according to claim 21, further comprising a first switch for switching the first signal to the particular cable tell final based on the determined orientation, whereby the first signal is coupled to the particular wire in the cable and a second switch for switching the second signal to the particular duplicate cable terminal based on the determined orientation, whereby the second signal is not coupled to the particular wire in the cable.

23. A cable connector according to claim 22, wherein the first signal is a control or data signal and the second signal is a power signal for powering circuitry in the cable connector.

24. A cable connector according to claim 21, further comprising means for determining an orientation of the cable connector comprises sensing circuitry.

25. A cable connector according to claim 24, wherein either:
a signal is applied to both the particular host terminal and the particular duplicate host terminal and the sensing circuitry determines which of the particular host terminal and the particular duplicate host terminal is connected to the particular cable terminal based on a change in the applied signal or sensing circuitry senses if there are other signals which are connected through the cable connector in one orientation, the presence or absence of connectivity of these signals being used to determine the cable connector orientation.

26. A cable connector according to claim 25, wherein the sensing circuitry determines an orientation of a housing of the cable connector by a sense pin on the housing that uses a physical asymmetry in the cable connector to detect the cable connector orientation.

27. A cable connector according to claim 26, wherein the sense pin is shortable to ground when the cable connector is in a first orientation, but is left floating in a second orientation.

28. A cable connector according to claim 21, wherein the first signal is switched to whichever of the particular host terminal or particular duplicate host terminal is connected to the particular cable terminal, based on the determined orientation.

29. A cable connector according to claim 24, further comprising a switch controller coupled to the means for determining an orientation of the cable connector and to first and second switches for controlling the first and second switches to switch either the first signal or the second signal to the particular plug terminal or the particular duplicate plug terminal based on the determined orientation.

30. A cable connector according to claim 29, wherein the switch controller is located in either the host device or in the cable connector.

31. A cable connector according to claim 24, wherein the means for determining an orientation of the cable connector is located either in the host device or in the cable connector.

* * * * *